July 7, 1925.
L. D. O'NEIL
1,545,166
VEHICLE DIRECTION INDICATOR
Filed Nov. 1, 1924   2 Sheets-Sheet 2
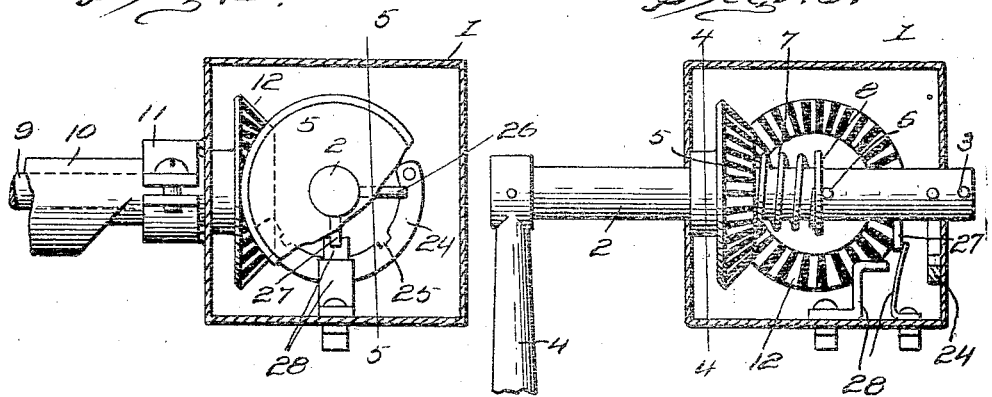
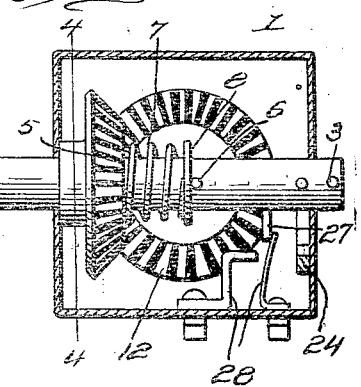
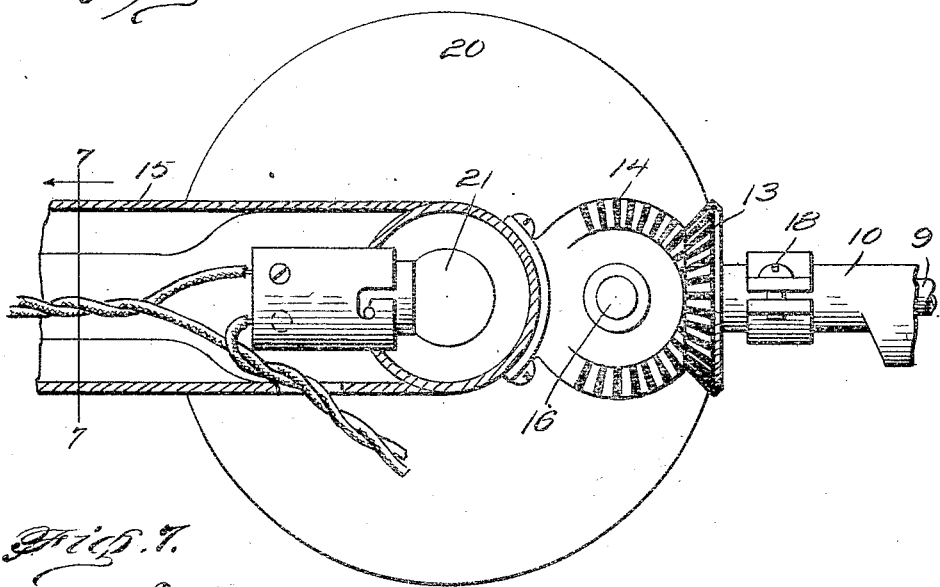
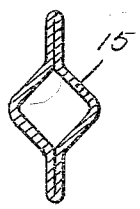
Inventor
L. D. O'Neil,
By Clarence A. O'Brien
Attorney Patented July 7, 1925.

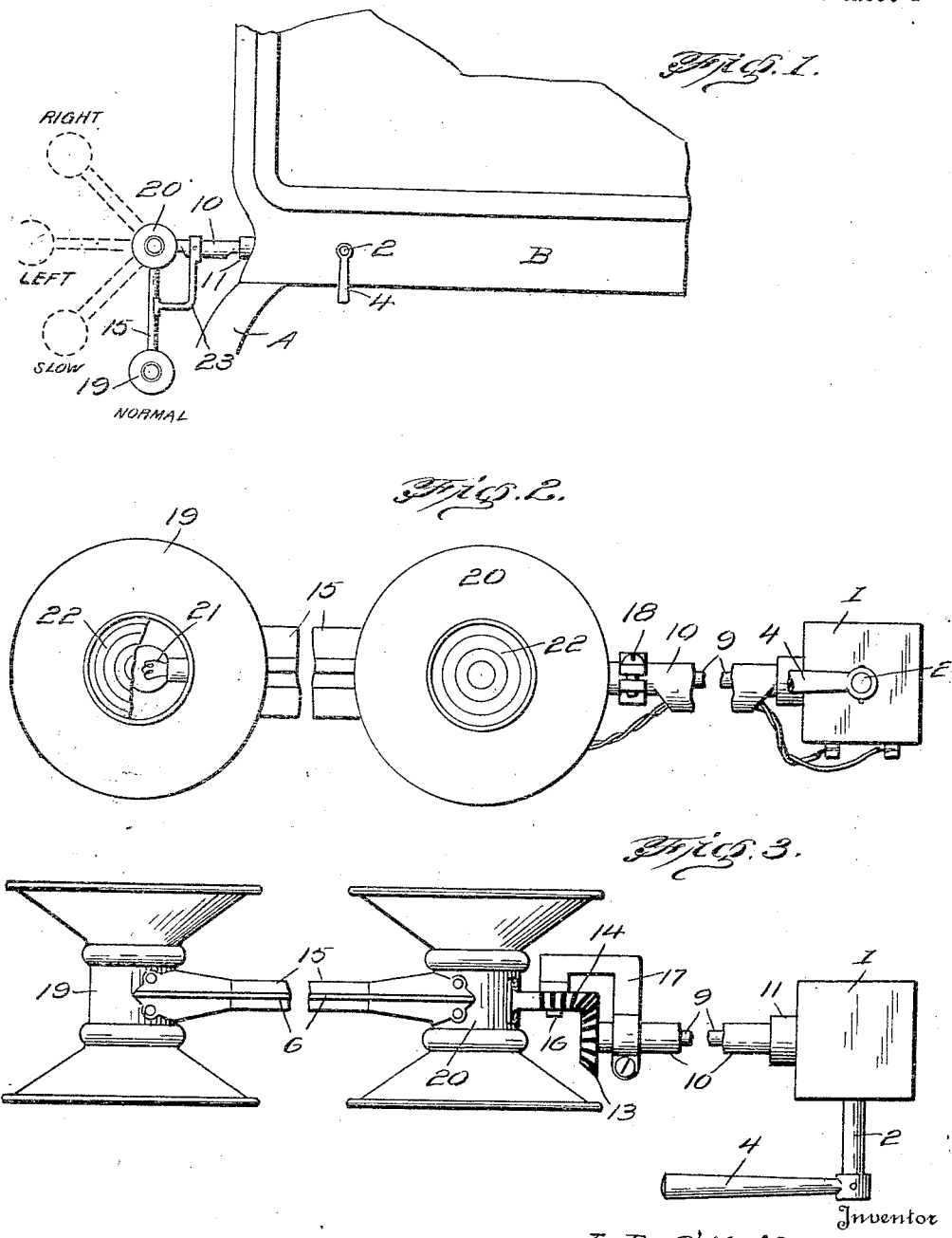

1,545,166

UNITED STATES PATENT OFFICE.

LAWRENCE D. O'NEIL, OF GRAND JUNCTION, COLORADO.

VEHICLE DIRECTION INDICATOR.

Application filed November 1, 1924. Serial No. 747,298.

*To all whom it may concern:*

Be it known that I, LAWRENCE D. O'NEIL, a citizen of the United States, residing at Grand Junction, in the county of Mesa and State of Colorado, have invented certain new and useful Improvements in Vehicle Direction Indicators, of which the following is a specification.

This invention relates to improvements in vehicle direction indicators, and has for its principal object to provide a simple and efficient means whereby the operator of a motor vehicle may efficiently actuate a signalling means which is visible to approaching, as well as pursuing motor vehicles, whereby the direction, in which the motor vehicle, upon which the signal is mounted, is to pursue, is indicated.

A further object of the invention is to provide a vehicle direction indicator of the above mentioned character, wherein the actuating means therefor is supported on the automobile, as to be readily accessible to the operator thus obviating the necessity of the operator having to place his hand outwardly of the car, in order to warn pursuing or approaching automobiles, as to the direction in which the motor vehicle travels.

A still further object of the invention is to provide a vehicle direction indicator of the above mentioned character, which is simple in construction, inexpensive, strong and durable, and further well adapted for the purposes for which it is designated.

Other objects and advantages of this invention will become apparent during the course of the following description.

In the accompanying drawings, forming a part of this specification, and in which like numerals designate like parts throughout the same:

Figure 1 is a side elevation of the vehicle direction indicator, showing the same in its normal position, on an automobile body.

Figure 2 is an enlarged side elevation of the signal arm and the casing, forming a part of the present invention.

Figure 3 is a top plan view thereof.

Figure 4 is a sectional view, taken approximately on the line 4—4 of Figure 5, with parts broken away.

Figure 5 is a section, taken on the line 5—5 of Figure 4.

Figure 6 is a sectional view, taken approximately on the line 6—6 of Figure 3, and Figure 7 is a sectional view, taken approximately on the line 7—7 of Figure 6.

In the drawings, wherein for the purpose of illustration is shown the preferred embodiment of my invention, the numeral 1 designates a substantially rectangular casing, which is supported forwardly of the dash board of an automobile, designated generally by the letter A, in any suitable manner. Extending through the forward and rear walls of the casing 1, and also through the dash board B is a rotary shaft 2. The shaft 2 is adapted for slidable movement through the casing, in the manner hereinafter to be more fully described, and for the purpose of limiting the inward movement of the shaft, so that the outer end thereof will not become disengaged from the forward wall of the casing, I provide a transversely extending pin 3, through the outer end of the shaft. An actuating handle 4 is secured to the inner end of the shaft 2, and is disposed in close proximity to the steering column, whereby the operator may have ready access thereto.

A bevelled gear 5 is splined on the shaft 2, and is disposed within the casing 1, adjacent the rear wall thereof.

A pin 6 extends transversely through the shaft 2, adjacent the outer end thereof. A coil spring 7 encircles the shaft 2, and has one end thereof engaging the bevelled gear 5, the other end being in engagement with a suitable washer 8, supported on the shaft 2, and abutting the outer ends of the transversely extending pins 6. The purpose of this construction will also be hereinafter more fully described.

Extending through the outer side wall of the casing 1, at right angles to the shaft 2 and laterally from the side of the body of the motor vehicle A, is the shaft 9. A suitable housing 10, is provided for the laterally extending shaft 9, and the inner end thereof is braced through the medium of a suitable collar 11, which is attached to the outer side wall of the casing 1. The inner end of the laterally extending shaft 9 extends into the casing 1, and carries thereon a bevelled gear 12, which is adapted to mesh with the bevelled gear 5, whereby the shaft 9 may be rotated simultaneously with the rotation of the shaft 2.

A bevelled gear 13 is carried by the outer end of the laterally extending shaft 9, the same being adapted for engagement with the segmental bevel gear 14, which is associated with the inner end of the signal arm, designated generally by the numeral 15, the segmental bevel gear 14 being further supported on a suitable pin 16, which extends laterally from the free end of an angular bracket 17, the latter being secured around the outer ends of the housing 10, for the shaft 9, in the manner as illustrated at 18.

The signal arm 14 supports, on its respective ends the lamp housings 19 and 20 respectively, the lamp housing being of such construction as to provide a means whereby the light from the electric lamp 21 may be visible through the red lenses 22 provided in the opposite side of each of the lamp housing, whereby approaching, as well as pursuing vehicles, may readily see the signal arm. The signal arm 15, as well as the lamp housings, are constructed of light metal, and the signal arm 15 is further hollow, as more clearly illustrated, in Figure 7, to permit the reception of the usual wiring employed for the electric lamp 21, associated with the lamp housing.

Normally, the signal arm 15 is disposed in the downwardly extending vertical position, as shown in Figure 1 of the drawings, and to limit the inward swinging movement of the signal arm 15 with respect to the shaft 9, so that the lamp housing 19 will not strike the side of the body of the motor vehicle, I provide the L-shaped bumper member 23. The signal arm 15 and the lamp housings associated therewith, is adapted to swing in a vertical plane for giving the desired signal to approaching, as well as pursuing vehicles, and the manner in which this is accomplished will be presently described.

An arcuate member 24 is secured to the forward face or wall of the casing 1, on the inside thereof, and the same is provided with the spaced notches 25, in its inner edge, as more clearly shown in Figure 4 of the drawing. A pin 26 extends laterally from the shaft 2, and is adapted for cooperation with the notches 25, formed in the inner edge of the arcuate member 24. When the pin 26 is seated in one of the notches 25, the shaft 2 is prevented from further rotation, and thereby causes the bevelled gears 13 and 14 to be held in interlocked engagement, so that the signal arm 15 will be disposed at a predetermined position, depending upon the notch in which the free end of the pin 26 is seated. The shaft 2 is adapted for rotation for swinging the signal arm 15 in the desired position, by pulling outwardly on the handle 4, whereby the shaft 2 will move longitudinally against the tension of the coil spring 7, and cause the pin 26 to be brought out of engagement with the notches 25. The shaft 2 is then rotated by turning the handle 4, to a predetermined position, and upon reaching such position, the handle is released, and the coil spring 7 will return the shaft 2 to its normal position, whereupon the pin 26 will again become seated in one of the notches 25. This will secure the signal arm in the set position, and thereby properly hold the lamp housing on the ends of the signal arm in the desired position, so that the proper signal may be given. As shown in Figure 1 of the drawing, the various positions in which the signal arm is disposed, will indicate to approaching, as well as pursuing vehicles, the direction in which the vehicle upon which the signal is mounted is going.

The circuit to the signalling lamp 21 is broken, when the signal arm is in its normal position, and this is accomplished by providing a projection 27 on the shaft 2, adjacent the outer end thereof, the same being adapted for engagement with the upper end of one of the contacts 28, in a manner as clearly illustrated in Figure 5 of the drawings. It is of course, to be understood that when the shaft 2 is rotated, for positioning the signal arm to give a predetermined signal, the projection 27 is moved out of engagement with one of the contacts, and the latter will be in engagement with each other, thereby closing the circuit to the electric lamps in the well known manner.

It will thus be seen from the foregoing description, that a vehicle direction indicator has been provided, which may be readily and easily placed in position upon a motor vehicle, and the same will be further operated by the operator of a vehicle, in a simple and efficient manner. The provision of a vehicle direction indicator of the character above described, will obviate the necessity of the operator of the motor vehicle having to place his hand out of the car, in order to give the desired signal to approaching and pursuing automobiles.

While I have shown the preferred embodiment of my invention, it is to be understood that various changes in the size, shape, and arrangement of parts may be resorted to, without departing from the spirit of the invention and the scope of the appended claims.

Having thus described my invention, what I claim is:

1. A vehicle direction indicator comprising a casing, a shaft extending through the opposed sides thereof and adapted for slidable movement, a beveled gear splined on said shaft and disposed in said casing, an additional shaft extending at right angles to the aforementioned shaft and laterally from the sides of the body of the vehicle, a housing for said last mentioned shaft associated with the side of the casing, a signal member adapted for vertical swinging movement on the outer end of said laterally extending shaft, a bevel gear on the inner end of said laterally extending shaft adapted to mesh with the aforementioned beveled gear, a handle on the rear end of the slidable shaft for permitting the rotation of the shaft and the slidable movement thereof, means associated with the casing and the forward end of the slidable shaft whereby the signal member is held in a predetermined position, means for normally holding the slidable shaft in its normal position, and means for limiting the inward swinging movement of the signal member.

2. A vehicle direction indicator comprising a casing, a shaft extending through the opposed sides thereof and adapted for slidable movement, a beveled gear splined on said shaft and disposed in said casing, an additional shaft extending at right angles to the aforementioned shaft and laterally from the sides of the body of the vehicle, a housing for said last mentioned shaft associated with the side of the casing, a signal member adapted for vertical swinging movement on the outer end of said laterally extending shaft, a bevel gear on the inner end of said laterally extending shaft adapted to mesh with the aforementioned beveled gear, a handle on the rear end of the slidable shaft for permitting the rotation of the shaft and the slidable movement thereof, means associated with the casing and the forward end of the slidable shaft whereby the signal member is held in a predetermined position, means for normally holding the slidable shaft in its normal position, means for limiting the inward swinging movement of the signal member, said last mentioned means comprising a bracket depending from the outer end of said housing.

3. A vehicle direction indicator comprising a casing, a shaft extending through the opposite sides thereof and adapted for slidable movement, a beveled gear splined on said shaft and disposed in said casing, an additional shaft extending at right angles to the aforementioned shaft and laterally from the side of the body of the vehicle, a housing for said last mentioned shaft extending from the side of the casing, a signal member, a bracket for supporting the inner end of the signal member on the outer end of said housing, means associated with the signal member, and the outer end of the laterally extending shaft whereby said signal member is adapted for vertical swinging movement, a beveled gear on the inner end of the laterally extending shaft adapted for engagement with the aforementioned beveled gear, a handle on the rear end of the slidable shaft for rotating and sliding the same, means for locking the first mentioned shaft against rotation whereby the signal member is held in a predetermined position, said locking means comprising an arcuate member secured on the inner side of the casing and having spaced notches on the inner edge thereof, a pin carried by the shaft and adapted for cooperation with said notches, and means for normally holding the slidable shaft in its normal position.

4. A vehicle direction indicator comprising a casing, a shaft extending through the opposite sides thereof and adapted for slidable movement, a beveled gear splined on said shaft and disposed in said casing, an additional shaft extending at right angles to the aforementioned shaft and laterally from the side of the body of the vehicle, a housing for said last mentioned shaft extending from the side of the casing, a signal member, a bracket for supporting the inner end of the signal member on the outer end of said housing, means associated with the signal member, and the outer end of the laterally extending shaft whereby said signal member is adapted for vertical swinging movement, a beveled gear on the inner end of the laterally extending shaft adapted for engagement with the aforementioned beveled gear, a handle on the rear end of the slidable shaft for rotating and sliding the same, means for locking the first mentioned shaft against rotation whereby the signal member is held in a predetermined position, said locking means comprising an arcuate member secured on the inner side of the casing and having spaced notches on the inner edge thereof, a pin carried by the shaft and adapted for cooperation with said notches, and means for normally holding the slidable shaft in its normal position, and a bumper element depending from the outer end of the housing and providing a means for limiting the inward swinging movement of the signal member.

In testimony whereof I affix my signature.

LAWRENCE D. O'NEIL.